United States Patent
Biber et al.

(10) Patent No.: US 8,874,269 B2
(45) Date of Patent: Oct. 28, 2014

(54) ROBOTIC VEHICLE WITH DRIVE MEANS AND METHOD FOR ACTIVATING DRIVE MEANS

(75) Inventors: Peter Biber, Tuebingen (DE); Christoph Koch, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 1353 days.

(21) Appl. No.: 12/599,985

(22) PCT Filed: May 15, 2008

(86) PCT No.: PCT/EP2008/055968
§ 371 (c)(1),
(2), (4) Date: Oct. 25, 2010

(87) PCT Pub. No.: WO2008/138967
PCT Pub. Date: Nov. 20, 2008

(65) Prior Publication Data
US 2011/0040409 A1    Feb. 17, 2011

(30) Foreign Application Priority Data

May 16, 2007 (DE) .......................... 10 2007 023 157

(51) Int. Cl.
| | | |
|---|---|---|
| G05B 15/00 | (2006.01) | |
| G05B 19/00 | (2006.01) | |
| A01B 69/04 | (2006.01) | |
| A01D 34/82 | (2006.01) | |
| G05D 1/02 | (2006.01) | |
| A01D 34/00 | (2006.01) | |

(52) U.S. Cl.
CPC ............ *G05D 1/0242* (2013.01); *A01B 69/008* (2013.01); *G05D 2201/0208* (2013.01); *A01D 34/828* (2013.01); *A01D 34/008* (2013.01); *G05D 1/0231* (2013.01)

USPC ........... 700/259; 700/245; 700/253; 700/258; 318/568.12; 318/568.16; 180/168; 180/169; 348/164; 382/108; 382/110

(58) Field of Classification Search
USPC ............. 700/245, 253, 258, 259; 318/568.12, 318/568.16; 180/168, 169; 348/164; 382/108, 110
See application file for complete search history.

(56) References Cited

U.S. PATENT DOCUMENTS 4,302,108 A * 11/1981 Timson .......................... 356/450
4,996,468 A * 2/1991 Field et al. .................... 318/587
(Continued)

FOREIGN PATENT DOCUMENTS

| | | |
|---|---|---|
| DE | 199 32 552 | 2/2000 |
| EP | 1 704 766 | 9/2006 |
| GB | 2 200 446 | 8/1988 |
| JP | 2-277105 | 11/1990 |

*Primary Examiner* — Dalena Tran
*Assistant Examiner* — Jaime Figueroa
(74) *Attorney, Agent, or Firm* — Maginot, Moore & Beck

(57) ABSTRACT

The invention relates to a robotic vehicle (1), in particular a robotic vehicle (1) designed for self-contained operations, with drive means (5) for the movement of the vehicle (1) on the subsurface (11), and with control means (7) for the activation of the drive means (5) in accordance with the measured intensity of the infrared radiation. According to the invention, a light sensor (9) is provided to detect the intensity of light radiation from the visible spectrum reflected from the subsurface (11), and in addition the control means (7) are designed to activate the drive means (5) in accordance with the measured intensity of the light radiation. The invention further relates to a method of activation.

17 Claims, 3 Drawing Sheets

(56) References Cited

U.S. PATENT DOCUMENTS

| | | |
|---|---|---|
| 5,086,535 A * | 2/1992 | Grossmeyer et al. ............ 15/319 |
| 5,622,236 A | 4/1997 | Azumi et al. |
| 5,974,347 A * | 10/1999 | Nelson ............................. 701/22 |
| 6,052,187 A * | 4/2000 | Krishnan et al. ............... 356/364 |
| 6,089,006 A * | 7/2000 | Langford et al. ................ 56/202 |
| 6,483,583 B1 * | 11/2002 | Wright et al. ................... 356/326 |
| 7,099,004 B2 * | 8/2006 | Masten .......................... 356/328 |
| 7,708,493 B2 * | 5/2010 | Jung et al. ........................ 404/12 |
| 7,916,898 B2 * | 3/2011 | Anderson ...................... 382/104 |
| 2001/0016053 A1 * | 8/2001 | Dickson et al. ................ 382/110 |
| 2003/0019152 A1 * | 1/2003 | Raun et al. ................ 47/58.1 SC |
| 2003/0070852 A1 * | 4/2003 | Angott ........................... 180/168 |
| 2005/0088643 A1 * | 4/2005 | Anderson ..................... 356/5.01 |
| 2005/0122513 A1 * | 6/2005 | Masten .......................... 356/328 |
| 2005/0253927 A1 * | 11/2005 | Allik et al. ..................... 348/164 |
| 2007/0048084 A1 * | 3/2007 | Jung et al. .......................... 404/9 |

* cited by examiner

ROBOTIC VEHICLE WITH DRIVE MEANS AND METHOD FOR ACTIVATING DRIVE MEANS

This application is a National Stage Application of PCT/EP2008/055968, filed 15 May 2008, which claims benefit of Serial No. 10 2007 023 157.3, filed 16 May 2007 in Germany and which application(s) are incorporated herein by reference. To the extent appropriate, a claim of priority is made to each of the above disclosed applications.

BACKGROUND

STATE OF THE ART

The invention relates to a robotic vehicle that is construed for a self-contained operation according to the generic term of claim 1 as well as a method for controlling drive means for the movement of such a self-contained robotic vehicle on a subsurface according to the generic term of claim 19.

At autonomous lawnmowers, which means for a self-contained operation, there is the problem, that the work surface, namely a lawn, is usually not surrounded by a determined margin, which could serve as clearly recognizable border for the orientation of the lawnmower. Compared to for example household robots it is insofar difficult at lawnmowers to realize suitable control solutions. That problem is complicated thereby that the lawn usually provide an irregular outer shape. In order to avoid that the lawnmower leaves the lawn during the self-contained operation it is familiar to direct the lawnmower along a current-carrying conductor that is buried under the lawn. The installation of such a guide wire is however very expensive and usually not practicable.

It is know from DE 199 32 552 A1 to equip the lawnmower with an infrared sensor as well as with an ultrasound sensor in order to analyze the subsurface structure. The sensors are assigned to an infrared sensor for sensing out an infrared radiation as well as an ultrasound sensor for sending out ultrasounds. Due to the intensities of the infrared radiation reflecting from the lawn and the ultrasound waves reflecting from the lawn that have been measured by the sensors and it is determined by a logic unit whether the lawnmower is on the lawn or not. Based on this information drive means of the lawnmower are then controlled.

The disadvantage of the known lawnmower vehicle is that invalid measurements can occur due to various reflections and overlapping appearances of the ultrasound waves. Besides ultrasound sensors are constructed elaborately and expensive.

EP 1 704 766 A1 describes a lawnmower vehicle, which analyzes the subsurface in front of the lawnmower vehicle with the aid of infrared sensors that are fixed at the top of the lawnmower vehicle. The reflectance of the subsurface is thereby calculated from the detected reflection intensity and the distance to the measuring surface (measuring spots). The disadvantage is thereby the necessity to measure the distance, because it causes additional sensor costs and can only be realized difficulty in order to be robust.

SUMMARY

Technical Task

The invention is therefore based on the task to suggest a robotic vehicle that is designed for a self-contained operation, whose drive means can be controlled reliably depending on the subsurface structure. The task is furthermore to suggest a correspondingly optimized control method for such a robotic vehicle.

Technical Solution

Regarding the vehicle the task is solved by the characteristics of claim 1 and regarding the method by the characteristics of claim 19. Advantageous improvements of the invention are stated in the sub-claims. All combinations of at least two characteristics that are disclosed in the description, the claims and/or the figures fall within the scope of the invention. Even values that lie within the mentioned borders should be disclosed as boundary values and be used randomly at an indicated range of values. In order to avoid repetitions only characteristics that are disclosed according to the device should be disclosed as according to the invention and vice versa.

The invention is based on the perception that the intensity of a light radiation reflecting from a subsurface from the visible spectrum deviates partially strongly from the intensity of an infrared radiation reflecting from the same subsurface depending on the subsurface structure. Thus it has been for example determined that the reflectivity of chlorophyll-containing vegetation in the near infrared range is significantly higher (approximately 3 to 6 times higher) than in the visible spectrum. This feature distinguishes grass from many other subsurfaces, which can occur in the backyard, such as for example concrete, sand, asphalt or dirt. The invention uses this perception by providing at least one light sensor for detecting the intensity of a light radiation reflecting from the subsurface from the visible spectrum in addition to the at least one sensor for detecting the intensity of an infrared radiation reflecting from the subsurface. It is thereby provided according to the concept of the invention, that the control means (logic unit) is designed for controlling the drive means that preferably contain a steering device depending on the measured intensity of the reflected infrared radiation as well as depending on the measured intensity of the reflected visible light, thus process both measuring signals. Due to the combination of at least one infrared sensor and at least one light sensor there are essential advantages. On the one hand it is possible for the first time to waive a sender for sending out the radiation that has been detected with the sensors, because sunlight that contains infrared as well as visible radiation components can be used as radiation source. Thus it is also possible to construe the robotic vehicle without a sender. It is therefore imaginable to conduct sunlight in an area below the sensors on the subsurface. It is of course also possible to provide at least one sender for sending out an infrared radiation and/or a light radiation from the visible spectrum in order to minimize interfering influences. A further advantage of the additional provision of a light sensor is that a light sensor is construed more simply and therefore less interference-prone and cheaper as compared to an ultrasound sensor that is known from the state of the art. Furthermore the main measurement of visible light waves is essentially less interference-prone than the measurement of ultrasound waves described in the state of the art.

It is advantageously provided as an improvement of the invention that the control means link the measured intensity of the infrared radiation together with the measured intensity of the light radiation, in order to get a common decision criterion for the presence or absence of a certain subsurface structure. The control means can for example be construed in such a way that the presence of a subsurface consisting of grass is only assumed when the intensity of the infrared radiation reflecting at the subsurface lies in a certain tolerance field and simultaneously the intensity of the light radiation reflecting from the same subsurface lies in a different, in particular a lower tolerance field. Thereby a secure distinction criterion is achieved for the presence or absence of a certain subsurface characteristic or structure, as if the measuring values would be considered independent from each other. The sensor combination (infrared sensor plus light sensor) is especially applicable for distinguishing a lawn from other subsurfaces or for distinguishing certain characteristics of a lawn (mowed, not mowed). The linking of the intensities allows furthermore the determination a decision criterion without knowing the distance to the measuring surface.

One possibility to consider both measuring values when assessing the subsurface structure is to store corresponding tolerance fields for the measured intensities in a chart in a storage of the control means. Preferably the measured intensities are linked to a result by means of a mathematical function and it is checked by the control means whether this result is in a certain tolerance field. The mathematical function is preferably so construed that the result (decision criterion) is independent of the distance of the measuring spots of the sensors to the sensors and/or independent of the absolute measuring values (intensities). The measuring spots (measuring areas) are areas on the subsurface, from which the reflected radiation hits the sensors.

Advantageously it is provided that the control means determine a rate value of the measured intensities and compare this rate value (result) to rate values that a stored in a chart.

As mentioned in the beginning it is imaginable that the sun is used as sender for radiating the subsurface—thus that the robotic vehicle is designed without a sender with regard to the electro-magnetic radiation that is detected by the sensors. In order to minimize interfering influences on the measurement that is carried out by the sensors, preferably at least one sender is provided for sending out an infrared radiation and/or at least one sender for sending out visible light. It is within the scope of the invention to provide a common sender for the infrared radiation and the visible light.

In order to be able to achieve measuring results that are at least almost independent of the surrounding light it is advantageous if pulsed or amplitude-modulated diodes are used as senders and if the control means are construed accordingly to the processing of the pulsed or amplitude-modulated electro-magnetic radiation.

Particularly good results, in particular for detecting grass areas, have been achieved when the infrared sensor measures the intensity of near infrared radiation from the range between approximately 700 nm and approximately 2.500 nm. If a sender is provided for infrared radiation, it sends out preferably infrared radiation from this wave length range.

It furthermore showed to be advantageous if the intensity in the green (approximately 500 nm to 575 nm) and/or in the red (approximately 650 nm to 750 nm) wave length range is measured by the light sensor. In a preferred embodiment the light sensor is construed as a combination of at least two photo diodes for detecting the intensities of two different light wave length ranges. If a sender for visible light is provided it preferably emits light from at least one of these wave length ranges.

In order to increase the detection resolution it is provided according to an embodiment of the invention that several sensor units are arranged at the robotic vehicle, each comprising at least one infrared sensor and at least one light sensor. If only a one such a sensor unit is provided it cannot be excluded that the robotic vehicle is already partially located on a subsurface, which should not be driven on by the robotic vehicle.

It is practical to arrange the sensor units that are construed as described above along a transversal axis of the vehicle, thus transversal to the straight driving direction of the vehicle, in order to be able to analyze the subsurface that is in the area of the vehicle as extensive as possible, which means widespread. One embodiment is preferred, at which at least two rows of sensor units that are arranged behind each other in driving direction, in order to be able to follow the course of a border line optimally.

Particular advantageous is one embodiment, at which the sensor units are not arranged randomly along the transversal axis but at which the sensor units are arranged directly, preferably evenly distributed of the transversal axis.

It is within the scope of the invention to assign at least one of the sensor units, preferably a group of sensor units or each individual sensor unit to at least one sender for sending out infrared radiation and/or visible light. Alternatively the sensor units can also be construed passively, which means working without a sender.

One embodiment is particularly advantageous, at which the control means are construed to detect a border, in particular a border line, between two differently structured subsurface sections with the aid of decision criteria that are determined on the basis of the intensities that have been measured by the sensor units.

With the aid of so construed control means it is for example possible to detect the cutting edge of lawn, which means the border between an already mowed and a not yet mowed lawn, and to control the drive means of the vehicle based on this information. So construed control means are particularly suitable for the use in lawnmowers that work according to the mulch-principle, at which the mowed grass remains on the lawn. This results in a different reflectivity of the already mowed grass and the not yet mowed grass, whereby the measured intensity in the mowed grass is usually higher than the one in the not mowed grass, because the mowed blades of grass that lie transversally to the sensors provide a bigger reflection surface that the basically vertically standing blades of grass. If for example five sensor units are provided altogether along the transversal axis and if low intensities are measured by the first three sensor units and high intensity by the fourth and fifth sensor unit, the control means realize that the cutting edge is located between the third and the fourth sensor unit. Due to the thus gained information about the location of a border between two differently structured subsurface sections relative to the robotic vehicle special driving strategies or mowing strategies can be carried out.

It is for example possible to construe the control means in such a way that they control the drive means in such a way that the robotic vehicle moves along the determined border. This is particularly interesting at lawnmowers in order to realize a driving along the lawn in parallel tracks. It is thereby possible that the lawn is driven along in straight tracks, spiral-shaped or meander-shaped.

The control means are preferably construed in such a way that the border between the differently structured subsurface sections is preferably located permanently in a defined relative position to the robotic vehicle. Particularly at robotic vehicles that are construed as lawnmowers a consistent covering-over of the already cut section can be thereby realized, whereby a stripe-shaped staying of blades of grass between two adjoining driving tracks is advantageously avoided. It is a further advantage if the control means are designed in such a way that the robotic vehicle does not leave a certain working surface (for example a lawn).

One embodiment is particularly advantageous, at which the autonomous robotic vehicle is construed as lawnmower with a mower. The drive means of the lawnmower can thereby for example comprise a drive motor, which drives revolving wheels that are arranged on a shaft, whereby the drive means also comprise at least one revolving wheel that is steerable if necessary.

Alternatively it is possible to construe the lawnmower as air cushion vehicle, whereby the steering of such a vehicle preferably takes place by deflecting an air stream.

The lawnmower is advantageously equipped with means for turning the mower on an off, whereby the means are preferably construed in such a way that the mower is always switched off if the lawn mower leaves a lawn and/or if the lawnmower drives into an already mowed area. The means can be part of the control mean. The occasional switching-off of the mower causes an increased operating time of a lawnmower, if it is a battery-operated autonomous lawnmower. The switching-off function can also be realized as security function, for example by switching off the mower if the control means assume the presence of a subject or a living create in the area of the measuring surface of the sensors.

The invention furthermore relates to a method for controlling drive means for the movement of a vehicle that is designed for a self-contained operation, in particular for controlling a lawnmower. The core of the method is that the drive means are not only controlled depending on an infrared radiation reflected from the subsurface, but also depending on the intensity of a light radiation reflecting from the subsurface. With regard to further advantageous embodiments of the method according to the invention it is referred to the previous description of the vehicle, in which the advantageously possible steps of the procedure are disclosed partially according to the device.

BRIEF DESCRIPTION OF THE DRAWINGS

Further advantages, characteristics and details of the invention arise from the subsequent description of preferred embodiments as well as with the aid of the drawings; they shown in.

DETAILED DESCRIPTION

The same components and components with the same function are labeled in the figures with the same reference signs.

Figure 1:
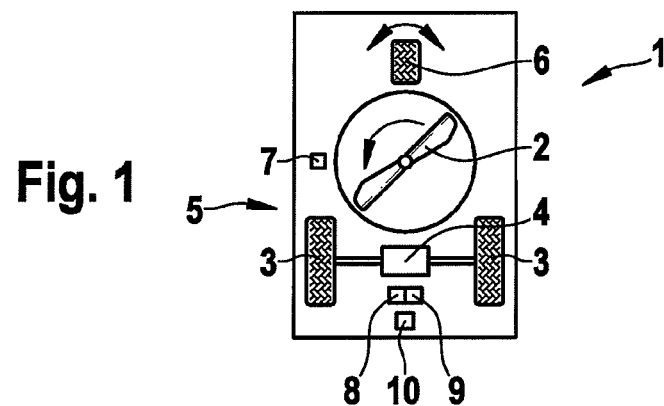
FIG. 1 is a schematic illustration of a vehicle that is construed as lawnmower in a bottom view.

FIG. 1 shows a robotic vehicle 1 that is construed as lawnmower in a bottom view. The robotic vehicle 1 comprises a rotatable mower 2, as well as two drive wheels 3, which can be driven with the aid of a drive motor 4 that is schematically illustrated. The drive wheels 3 as well as the drive motor 4 are part of the drive means 5 of the vehicle 1, also including a rotating, in particular steerable wheel 6. If the wheel 6 cannot be steered actively, a change of direction can be realized by different engine speeds of the drive wheels 3.

The robotic vehicle 1 furthermore comprises control means 7, which comprise at least one microprocessor and with which the drive motor 4 as well as the steerable wheel 6 of the drive means 5 can be controlled. The control means 7 serve simultaneously as means for switching the mower 2 on and off depending on the intensities that have been measured by the sensors 8, 9. The controlling of the drive means 5 takes place based on intensities of infrared radiation reflecting from a subsurface as well as light radiation reflecting from the subsurface, whereby they have been measured by an infrared sensor 8 and a light sensor 9. In order to illuminate the subsurface with infrared radiation and with light from the visible spectrum a common sender 10 is provided.

Figure 2:
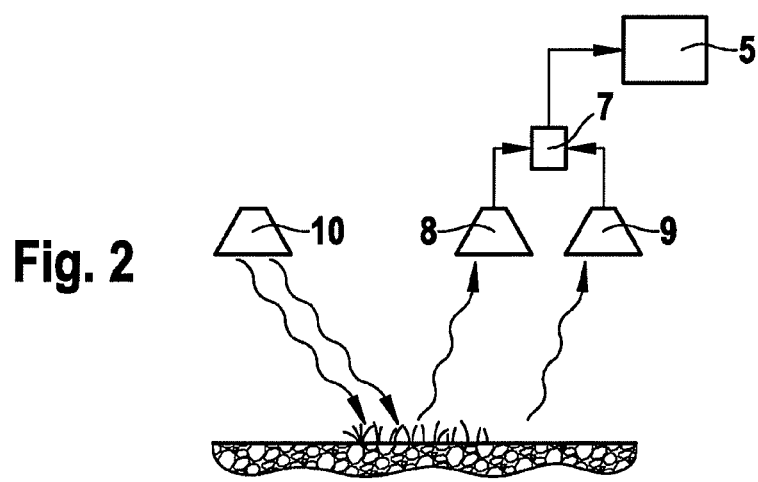
FIG. 2 is a schematic illustration of the arrangement of one sender as well as of two senders.

FIG. 2 shows a schematic arrangement of the infrared sensor 8 and the light sensor 9 as well as the sender 10. The sensor 10 is in this embodiment a pulsed diode. The sensors 8 and 9 are construed as photo transistors, whereby the infrared sensor 8 measures the intensity of infrared radiation in the near infrared area (700 nm to 2500 nm) and the light sensor 9 measures the intensity of visible light, in this embodiment in the red spectrum. The intensities that have been measured by the sensors 8, 9 are delivered as measuring signals to the control means 7 with the microprocessor. The signals are there linked together by a ratio production, whereby the microprocessor (evaluation circuit) of the control means 7 checks, whether the determined ratio value of the measured intensities lies within the expected range for grass. The result of the ratio production serves therefore as decision criterion for a certain controlling of the drive means 5.

Figure 3:
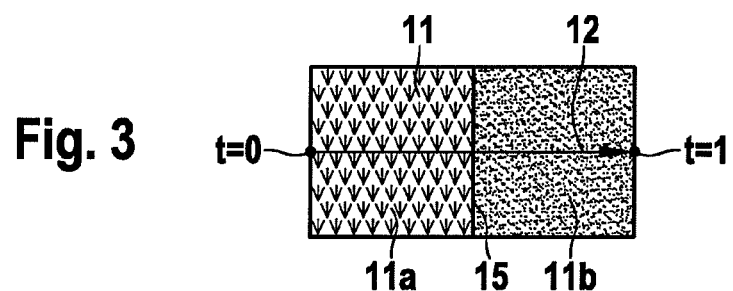
FIG. 3 is a schematic illustration of a possible driving route of a vehicle starting from a first subsurface in the direction of a second subsurface.
Figure 4:
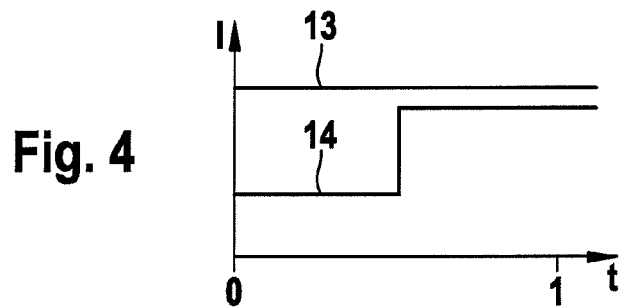
FIG. 4 is an illustration of the intensities that have been measured on the driving route according to FIG. 3 in a diagram.

FIG. 3 shows a subsurface 11, consisting of a first sub surface section 11a and a second subsurface section 11b, whereby the two subsurface sections 11a, 11b are structured differently—the subsurface section 11a is for example a lawn and the subsurface section 11b sand. If the robotic vehicle 1 drives now along the arrows 12 from the first subsurface section 11a into the section subsurface section 11b, the sensors 8, 9 measure the intensities 13, 14 that are shown in FIG. 4, whereby the intensity that is labeled with the reference sign 13 represents the intensity of the infrared radiation reflecting from the subsurface 11 and the intensity that is labeled with the reference sign 14 represents the intensity of visible light reflecting from the subsurface 11. It can be noticed that the relation of the intensities 13, 14 to each other changes when crossing a border 15 between the subsurface sections 11a, 11b, which is used as decision criterion for leaving the first subsurface section 11a. It is only shown exemplary that the intensity 13 of the infrared radiation remains almost constant, while the intensity 14 of the light radiation increases tangentially.

A turn of the vehicle 1 can be for example initiated directly after crossing the border 15 by a corresponding controlling of the drive means 5.

Figure 5:
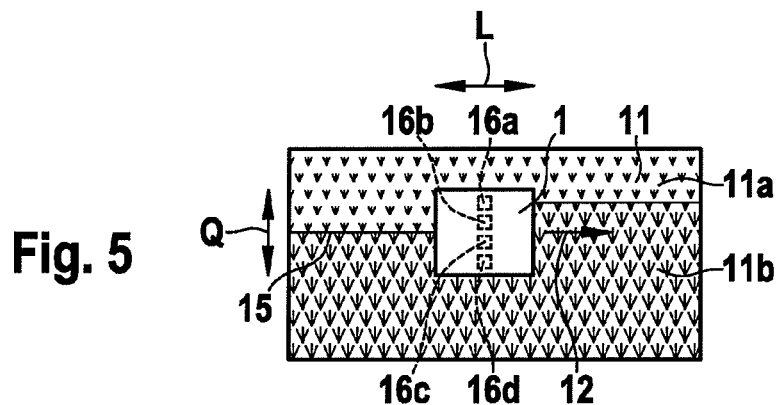
FIG. 5 is an illustration of a vehicle that is construed as lawnmower on a drive along a cutting edge of a lawn.

FIG. 5 also shows a robotic vehicle 1 construed as lawnmower on a subsurface 11 (lawn), whereby the robotic vehicle 1 drives in the direction of the arrow 12 along the cutting edge or the border 15 between the subsurface sections 11a and 11b. The first subsurface section 11a is thereby already mowed grass and the second subsurface section 11b not yet mowed grass. In order to determine where the border 15 is located relatively towards the robotic vehicle 1, in order to enable thereby a driving of the vehicle 1 along the border 15, in this embodiment four sensor units 16a, 16b, 16c, 16d are arranged evenly spread along a transversal axis Q of the vehicle 1, which extends vertically to a vehicle axis that extends in longitudinal direction of the vehicle, whereby each sensor unit 16a, 16b, 16c, 16d consists of an infrared sensor 8 and a light sensor 9.

Figure 6:
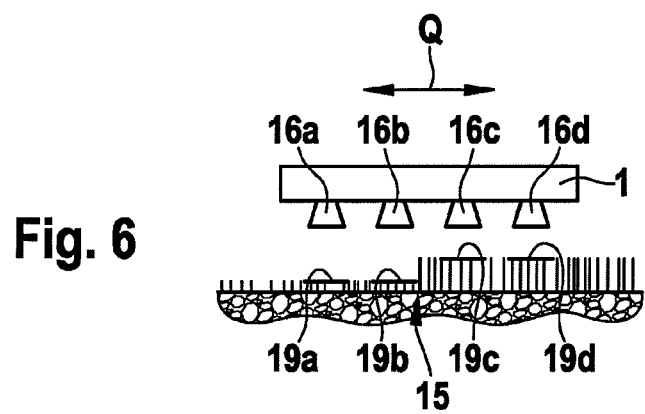
FIG. 6 is a possible arrangement of sensor units at the robotic vehicle that is shown in FIG. 5.
Figure 7:
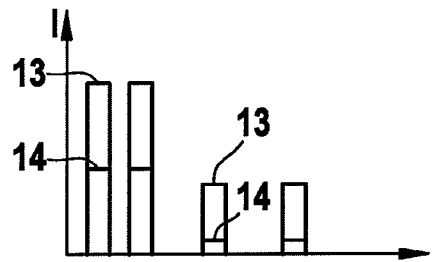
FIG. 7 is an illustration of the intensities of the sensor units that have been measured during the drive of the vehicle as shown in FIG. 5 in a diagram.

FIG. 6 shows the arrangement of these sensor units 16a, 16b, 16c, 16d along the transversal axis Q. The intensities of infrared radiation and visible light that are measured by the sensor units 16a, 16b, 16c, 16d in corresponding measuring spots 19a, 19b, 19c, 19d are shown in the diagram according to FIG. 7. By a comparison of the intensities or the intensity ratios it can be determined with the aid of the control means 7, that the border 15 (cutting edge) is located between the second sensor unit 16b and the third sensor unit 16c. The control means are construed in such a way that the robotic vehicle 1 drives along the longitudinal extension of the border 15, thus the cutting edge remains between the sensor units 16b and 16c. If the cutting edge drifts away from the area between those sensor units the driving direction is correspondingly corrected by the control means 7, so that the subsurface that consists of grass is driven along time-effectively and therefore mowed. The areal detection resolution is thereby determined by the number of sensor units and the areal arrangement or the planar arrangement of the sensor units. The described cutting edge measurement can be used for driving along parallel tracks and enables thus the realization of a mowing strategy for an efficient complete covering of the working surface.

Figure 8:
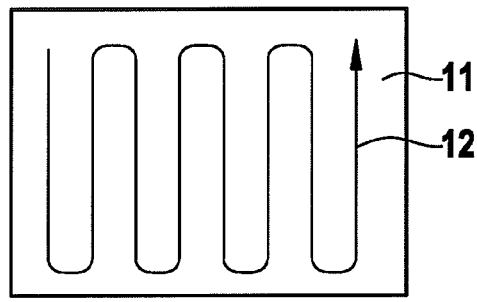
FIG. 8 is a graphic illustration of a possible driving strategy (mowing strategy) for a lawnmower for mowing a lawn and FIG. 9 shows the illustration of a vehicle that is construed as lawnmower during the drive along a cutting edge, whereby adjoin tracks overlap.

FIG. 8 shows an example for such a strategy. The subsurface 11 is thereby completely covered by a meander-shaped driving along the track that is indicated by the arrow 12. The tracks that run parallel to each other are thereby easy to notice.

Figure 9:
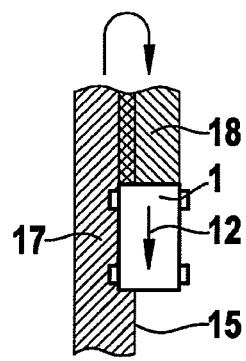

FIG. 9 shows in detail how tracks 17, 18 that are parallel to each other can be driven along. The track 18, which is just mowed, overlaps thereby the already mowed track 17 partially, whereby a staying of blades of grass between the tracks 17, 18 is avoided. Preferably the robotic vehicle 1 that is construed as lawn mower comprises a measuring unit that is here schematically shown in FIG. 6 with a number of sensor unit 16a, 16b, 16c, 16d for detecting the border 15 (cutting edge), so that a constant covering of the tracks 17, 18 is maintained by a corresponding controlling of the drive means. Due to the ability to drive along tracks that are parallel to each other also other mowing strategies than the meander-shaped mowing strategy that is shown in FIG. 8 can be realized as for example the driving along the subsurface 11 in spirals.

The invention claimed is:

1. A robotic vehicle designed for self-contained operation, comprising:
    drive means for the movement of the vehicle on a surface;
    an infrared sensor configured to detect the intensity of an infrared radiation reflected from the surface;
    control means for the activation of the drive means depending on the measured intensity of the infrared radiation;
    a light sensor configured to detect the intensity of the light radiation from the visible spectrum reflected from the surface,
    wherein the control means are configured to control the drive means depending on the intensity of the light radiation,
    wherein the control means consider the intensity of the infrared radiation and the intensity of the light radiation as common decision criterion for the presence or absence of a certain surface structure, and
    wherein the common decision criterion is generated by linking the intensities with a mathematic function whose result is independent of the distance of the sensors to their measuring spots on the surface or independent of the absolute intensities.

2. The robotic vehicle according to claim 1, wherein the decision criterion is generated by creating the relation of the intensities.

3. The robotic vehicle according to claim 1, wherein the infrared sensor or the light sensor work passively.

4. The robotic vehicle according to claim 1, wherein at least one sensor is provided for sending out the infrared radiation or the visible light radiation.

5. The robotic vehicle according to claim 4 wherein the sensor is construed as pulsed or amplitude-modulated diode.

6. The robotic vehicle according to claim 1, wherein the infrared sensor measures the intensity of the infrared radiation from the near infrared spectrum.

7. The robotic vehicle according to claim 1, wherein the light sensor measures the intensity of the light from the green or red spectrum.

8. The robotic vehicle according to claim 1, further comprising more than one sensor unit, wherein the infrared sensor and the light sensor comprise a sensor unit.

9. The robotic vehicle according to claim 8, wherein the sensor units are arranged evenly spread along a transversal axis of the vehicle, the transversal axis of the vehicle oriented transversally to a vehicle axis that runs in driving direction.

10. The robotic vehicle according to claim 9 wherein the sensor units are arranged next to each other, evenly spaced, aligned on the transversal axis of the vehicle.

11. The robotic vehicle according to claim 8, wherein at least one of the sensor units is assigned to at least one sender for sending out infrared radiation or light from the visible spectrum.

12. The robotic vehicle according to claim 8, wherein the control means detect a borderline between two differently structured surface sections with the aid of decision criteria, the borderline resulting from the corresponding link of the intensities that have been measured by the sensors of the sensor units.

13. The robotic vehicle according to claim 12, wherein the control means that control the drive means are construed in such a way that the robotic vehicle drives along the border or does not leave a work surface.

14. The robotic vehicle according to claim 12, wherein the control means that control the drive means are construed in such a way that the robotic vehicle drives simultaneously over both surface sections.

15. The robotic vehicle according to claim 1, wherein the robotic vehicle is a lawnmower with a mower.

16. The robotic vehicle according to claim 15 wherein the lawnmower provides means for turning the mower on and off depending on the measured intensities depending on the detection of a subject or a living creature by the control means.

17. A method for controlling drive means for moving a robotic vehicle configured for self-contained operation, comprising:
measuring the intensity of an infrared radiation reflected from a surface; and
controlling the drive means using the measured intensity of a light radiation from the visible spectrum that is reflected from the surface as common decision criterion for the presence or absence of a certain surface structure,
wherein the common decision criterion is generated by linking the intensities with a mathematic function whose result is independent of the distance of the sensors to their measuring spots on the surface or independent of the absolute intensities.

* * * * *